F. SIMONS.
PACKING RING.
APPLICATION FILED OCT. 12, 1914.
1,133,672.  Patented Mar. 30, 1915.
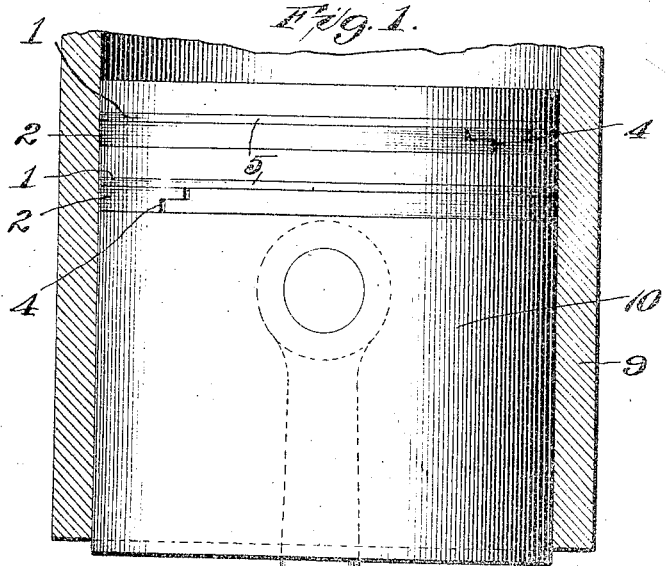
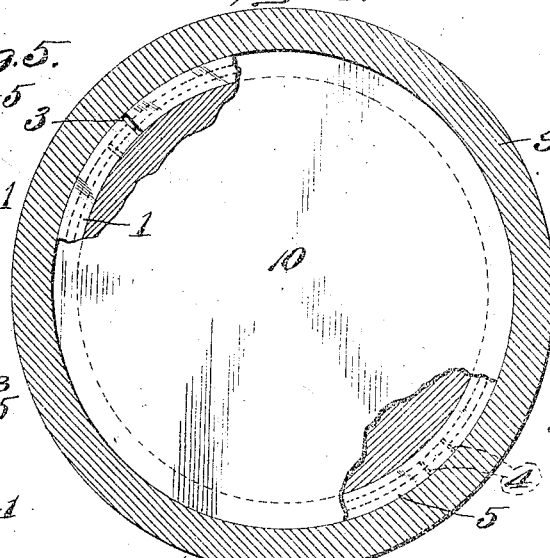
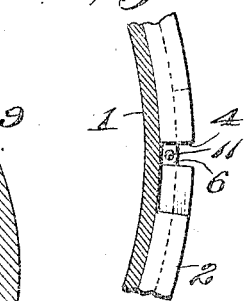
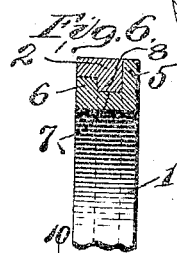
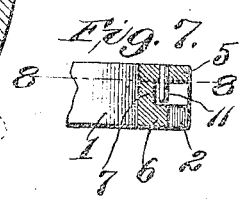
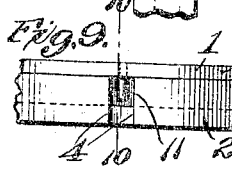
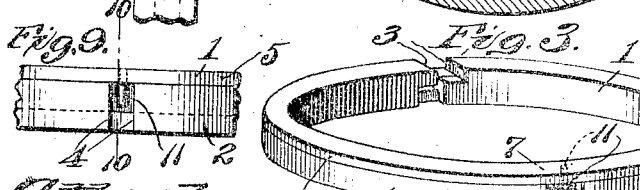

UNITED STATES PATENT OFFICE.

FRANK SIMONS, OF ST. LOUIS, MISSOURI.

PACKING-RING.

1,133,672.  Specification of Letters Patent.  Patented Mar. 30, 1915.

Application filed October 12, 1914. Serial No. 866,187.

*To all whom it may concern:*

Be it known that I, FRANK SIMONS, a citizen of the United States, residing at the city of St. Louis, State of Missouri, have invented certain new and useful Improvements in Packing-Rings, of which the following is a specification.

This invention relates to improvements in packing rings and particularly to improvements in packing rings adapted for use with pistons, and has for one of its objects to provide an efficient packing ring which may be applied readily wherever required to form a leak-proof joint.

Another object is to provide a packing ring which is so constructed that the parts of same are held together to prevent the losing of one part from the other when the packing ring is not in use, and a further object is to provide a compact packing ring the parts of which will not separate when same is in use and thus reduce its efficiency as a leak-proof packing ring.

In the accompanying drawings forming part of this specification, in which like numbers of reference denote like parts wherever they occur, Figure 1 is a vertical sectional view of part of a cylinder of an engine showing the piston therein in elevation and equipped with two packing rings embodying the present invention; Fig. 2 is a horizontal sectional view of a cylinder of an engine showing a packing ring embodying the present invention in place on a piston, parts of the head of said piston being broken away better to illustrate the association of parts; Fig. 3 is a perspective view of a preferred form of packing ring embodying the present invention; Fig. 4 is a transverse sectional view of a fragment of one of the rings comprising the packing ring embodying the present invention; Fig. 5 is a transverse sectional view of a fragment of the base-ring of said packing ring; Fig. 6 is a transverse sectional view showing fragment Fig. 4 in place upon fragment Fig. 5; Fig. 7 is a vertical sectional view on the line 7—7, Fig. 3, with a fragment of the ring in elevation; Fig. 8 is a sectional view on the line 8—8, Fig. 7; Fig. 9 is a view showing a fragment of a modified form of a packing ring embodying the present invention, the superimposed ring thereof being transversely divided by means of a simple straight cut; and Fig. 10 is a sectional view on the line 10—10, Fig. 9.

Base ring 1 adapted to receive superimposed ring 2 (as hereinafter described) are each made of any suitable material, such, for instance, as cast-iron, brass, or the like, it being understood that base-ring 1 may be made of one material and superimposed ring 2 may be made of another material if desired. Rings 1 and 2 are each split transversely at 3 and 4, respectively, preferably by means of overlapping rabbet-shaped cuts best seen in Fig. 3, but which may, also, be formed by means of a straight transverse cut 4 shown in Fig. 9, or otherwise. The outer surface of base-ring 1 bears two flanges 5 and 6, flange 5 being of relatively greater depth than flange 6, said flanges forming peripheral groove 7 in the outer surface of said base-ring 1. The inner surface of superimposed ring 2 bears a tongue 8 adapted to fit in groove 7 of base-ring 1, said tongue 8 depending from said inner surface of superimposed ring 2 flush with the lateral edge of said ring 2 adjacent the inner side-wall of the deeper flange 5 and said ring 2 extending away from said flange 5 over flange 6 and having its other lateral edge preferably flush with the outer wall of shallower flange 6, said ring 2 with its depending tongue 8 being L-shaped in cross section, as best seen in Fig. 4. Transverse cut 4 in ring 2 permits said ring to be sprung in place upon ring 1 and tongue 8 depending from the inner surface of ring 2 being seated in groove 7 of ring 1 and the upper outer surface of superimposed ring 2 being flush with the upper edge of flange 5 of ring 1, as best seen in Fig. 6, an even smooth surface will thereby be presented against the adjacent inner wall of cylinder 9 by the outer surface of a packing ring of this invention, in place upon a piston 10, said packing ring being readily inserted in place upon said piston because of transverse splits 3 and 4 in base ring 1 and in superimposed ring 2, respectively. Tongue 8 being adapted to fit in groove 7, transverse play between rings 1 and 2 is prevented, and, in order to hold rings 1 and 2 in substantially stationary relation to each other as to movement along the lines of their circumferences so as to prevent the gap formed at transverse split 3 of ring 1 from coinciding with transverse split 4 of ring 2, means are provided on ring 1 adapted to engage the edges of split 4 of ring 2 and to lock said ring against substantial motion circumferentially, said means comprising preferably a pin 11 borne by flange 5 of ring 1 and extending substantially across groove 7, said pin 11 being preferably located opposite transverse slit 3 of ring 1, but may be located at any other desired distance from said split 3. Said pin 11 extending across groove 7, as described, crosses the plain of circumferential movement of tongue 8 or parts adjacent thereto in said groove 7, and, when ring 2 is so placed upon ring 1 that the edges formed by split 4 and said tongue or parts adjacent thereto are adjacent to opposite sides of said pin 11, said pin will hold gaps formed in rings 1 and 2 by cuts 3 and 4, respectively, apart from each other and thus will prevent them from coinciding to break the substantial continuity of the device as a leak-proof packing ring.

Various changes in the details of construction and arrangement of parts may be made without departing from the nature and spirit of this invention.

I claim:

A packing ring comprising a transversely split base-ring, bearing a pair of flanges of relatively greater and less depth, said flanges being adapted to form a peripheral groove in the outer surface of said base-ring, a second transversely split ring bearing a member depending from its inner surface and, also, bearing a lateral extension, said second ring with its depending member and lateral extension being L-shaped in cross section, said depending member being adapted to seat in and substantially fill said groove and the under side of said lateral extension being adapted to be adjacent to the upper edge of the shallower of said flanges, the outer surface of said second ring and its extension being adapted to form a flush surface with the upper edge of the deeper of said flanges, and means borne by said base-ring adapted to maintain the gap formed by the transverse split in the second ring, and the gap formed by the transverse split in the base-ring in spaced relation to each other, comprising a pin borne by the flange of the first-mentioned ring and extending substantially across the peripheral groove, whereby the circumferential motion of the second mentioned ring is prevented.

In testimony whereof I hereunto affix my signature in the presence of two witnesses.

FRANK SIMONS.

Witnesses:
WALTER C. GUELS,
NANCY C. THOMAS.